Figure 1:
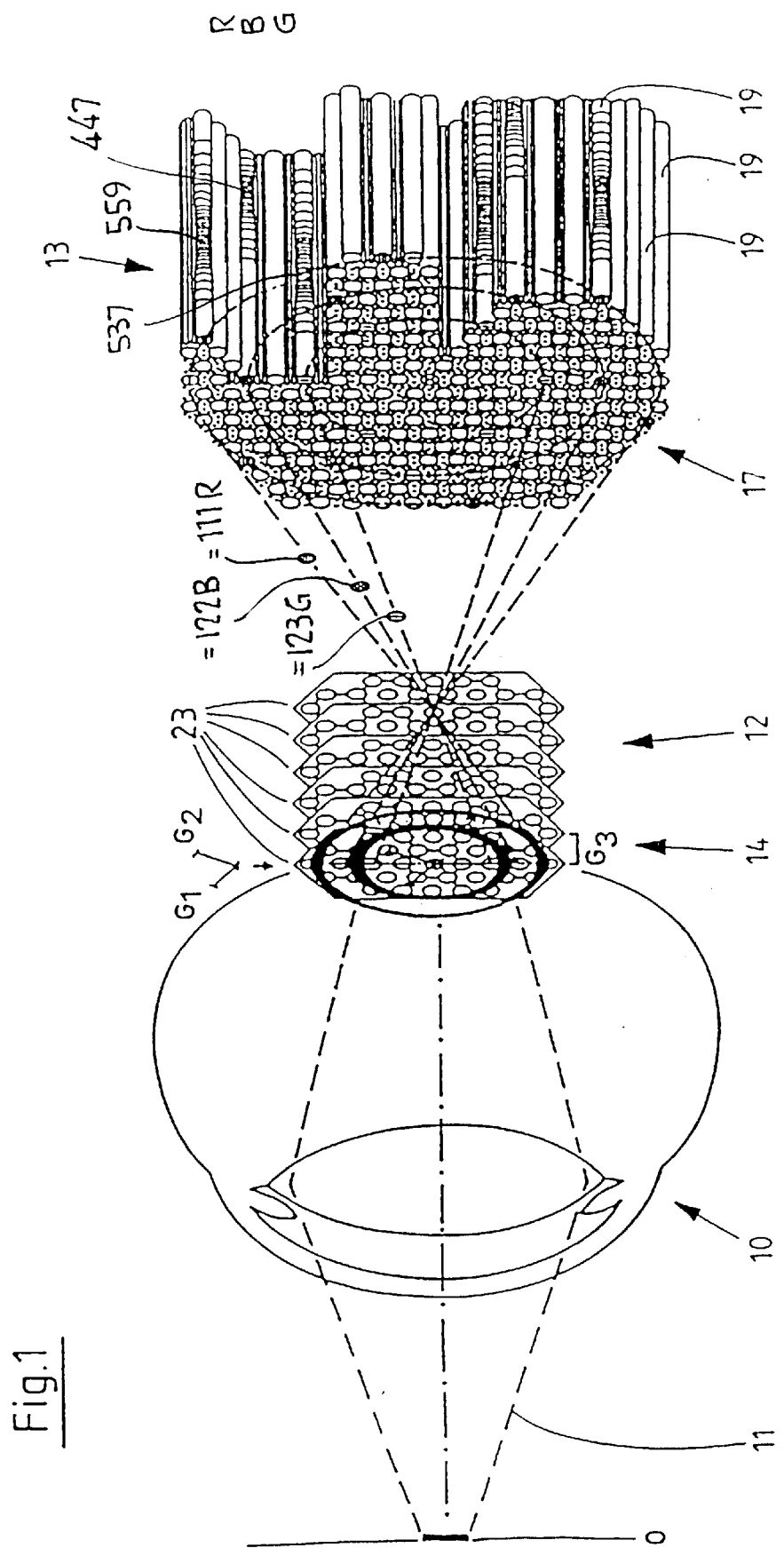

United States Patent [19]
Lauinger et al.

[11] Patent Number: 5,982,483
[45] Date of Patent: Nov. 9, 1999

[54] PROCESS AND DEVICE FOR HIGH-DEFINITION MEASUREMENT OF INTERVALS IN THE FOCUSED IMAGE PRODUCED BY A LENS-APERTURE DIAPHRAGM SYSTEM

[75] Inventors: Norbert Lauinger, Kalsmunt/Westhang 9, D-35578 Wetzlar; Hans-Otto Carmesin, Bremen; Eckhard Görnitz, Teltow; Sigurd Kusch, Berlin; Manfred Pinnow, Teltow, all of Germany

[73] Assignees: Norbert Lauinger, Wetzlar; Fraunhofer-Gesellschaft Zur Forderung Der Angewandten Forschung e.V., Munich, both of Germany

[21] Appl. No.: 09/077,993
[22] PCT Filed: Dec. 13, 1996
[86] PCT No.: PCT/EP96/05592
§ 371 Date: Jul. 27, 1998
§ 102(e) Date: Jul. 27, 1998
[87] PCT Pub. No.: WO97/22849
PCT Pub. Date: Jun. 26, 1997

[30] Foreign Application Priority Data

Dec. 15, 1995 [DE] Germany .......................... 195 47 036
Dec. 29, 1995 [DE] Germany .......................... 195 49 074

[51] Int. Cl.$^6$ .................................................. G01N 21/00
[52] U.S. Cl. ...................... 356/239.2; 356/375; 356/385; 356/347; 356/356
[58] Field of Search ...................................... 356/239, 375, 356/385, 347, 356, 360

[56] References Cited

U.S. PATENT DOCUMENTS 4,383,734  5/1983  Huignard et al. .................. 350/162.13
4,458,979  7/1984  Röss ..................................... 350/3.71

Primary Examiner—Frank G. Font
Assistant Examiner—Reginald A. Ratiff
Attorney, Agent, or Firm—Breiner & Breiner

[57] ABSTRACT

The invention relates to a method and apparatus for determining spatial and/or time intervals in the focused image or focused sequence of images of a lens-diaphragm system and/or of spatial, time-related object-parameters (10), spectral and/or local frequency-specific object parameters, in particular to control automatons and to monitor production sequences, focusing of the incident electromagnetic beams being implemented by the lens-diaphragm system (10), position-specific modulation of the direction of propagation, intensity, wavelength, polarization and/or of the time modulation frequency of the electromagnetic beams (11) being implemented by a 3D modulator (12) present behind the lens-diaphragm system (10) in or near the focal plane of the lens-diaphragm system (10), detection of the modulated electromagnetic beams being carried out by a detection system (13) located to the rear of the 3D modulator (12), and calculation of the spatial and/or time intervals (14) of the electromagnetic beams in the 3D modulator (12) being implemented by determining the modulation and/or computation of spatial, time-related, spectral and/or local frequency specific object-parameters

43 Claims, 16 Drawing Sheets

THE VOLUME HOLOGRAPHIC ELEMENT CONSISTING OF SEVERAL SUPERPOSED BRAGG GRATINGS IS LOCATED AT THE SITE OF THE 3D MODULATOR (12) NEAR THE FOCAL PLANE OF THE LENS-DIAPHRAGM SYSTEM (10). THE CCD DETECTION SYSTEM (ELECTRONIC RETINA) IS LOCATED IMMEDIATELY BEHIND THE VOLUME HOLOGRAPHIC ELEMENT.

FOURIER TRANSFORM USING A VOLUME HOLOGRAPHIC OPTIC ELEMENT

FOURIER TRANSFORM OF A BAR CODE
GENERATED USING AN OPTIC VOLUME
HOLOGRAPHIC ELEMENT

PROCESS AND DEVICE FOR HIGH-DEFINITION MEASUREMENT OF INTERVALS IN THE FOCUSED IMAGE PRODUCED BY A LENS-APERTURE DIAPHRAGM SYSTEM

BACKGROUND OF THE INVENTION

The invention concerns a method for accurately determining spatial and/or time intervals in the focused image of a lens/aperture-diaphragm system, herein called lens-diaphragm system, and/or of spatial and/or time parameters such as speed or depth of an object, in particular to accurately and intelligently control robots.

Cameras operating in a geometric-optics manner are already used in passive methods and they image onto photographic films or on arrays of charge-coupled devices (CCD). Both procedures provide spatial 3-D information in flat, 2-D form in the image plane. While the resolution of optic cameras is restricted only by optical parameters and by film grain size, on the other hand they are limited to storage and are unsuitable for processing in real time. While CCD cameras offer rapid image processing, they are, however, limited in their resolution by the pixel size of the CCD arrays. It is true that holographically imaging and recording devices can both provide and store spatial 3-D information, but only in coherent light. Moreover, a 2-beam procedure, namely an object and a reference beam, are inherently required in picture-taking. Lastly, holographic systems are able to process images in real time only under constrained conditions. Stereo cameras are technically even more complex and demand computations based on two CCD arrays to obtain 3D information.

As regards the technology of optic sensors, and in particular optical-grating spatial-frequency-filtering using the CORREVIT-/CORREFOT measurement technique (CORREVIT is a trademark of CORRSYS GmbH, Wetzlar, Germany), signal processing regarding length, speed and interval measurements of objects moving relative to the sensor (assembly line, industrial conveyor belts and such) are implemented by inserting gratings between geometric-optics imaging means and following photodiodes into the optic beam to act as signal modulators, as described for instance in German Patent Documents A 21 44 487 and AS 2156617. However, the gratings are used therein merely as 1D-/2D- beam splitters, not as diffraction 1D-/2D-/3D-gratings.

Theoretical modeling was carried out at the "Institut für Optosensorik Dr. Lauinger/Wetzlar" based on a 3D grating and relating to the "inverted retina of the human eye" that were considered relating (N. Lauinger, "A New Interpretation Of The Stiles-Crawford Effects In Human Vision", *Journal of Biological Physics,* 19: 167–188, 1994; N. Lauinger, "The Relationship Between Brightness, Hue And Saturation When The Inverted Human Retina Is Interpreted As A Cellular Diffractive 3D Chip", *SPIE Proceedings,* Vol. 2588, Oct. 1995, 208–232) to subjective phenomena known in human vision (aperture effects, the so-called Stiles-Crawford effects I and II, the Bezold bridge phenomenon, for example). Partial aspects were computed by modeling in 4D grating optics (M. Carbon, "Using Diffraction Theory Of Human Vision For Design Of Color Vision Devices", *SPIE Proceedings,* Vol. 2353, 1994, 550–560; N. Lauinger, "Inverted Retina Of The Human Eye; A Trichromatic 4D Space-Time Optical Correlator", *SPIE Proceedings,* Vol. 2904, 1996, 344–360). Effects of a diffraction 3D grating were described regarding incoherence-coherence transformation of optic radiation, as known from German Patent Document A 37 40 533.

In spite of vast and comprehensive endeavors especially regarding automation and robotics, there is to date no technically high resolution, rugged and real time determination of 3D motion based on contactless sensor data acquisition. The core significance of optical flux fields for visual determination of motion is known from German Patent Document A 195 03 606, also "Structure From Motion By Linear Transformation", Proc. Workshop "Kognitive Robotiki", B. Krieg-Bruckner, Ch. Herwig. Edts., ZKW-Bericht 3/95, Zentrum für Kognitionswissenschaften Universitat Bremen, March 1995. The essential performance features of neural networks are parallelism and adaptiveness (H. O. Carmesin, "Theorie Neuronaler Adaption", Koster, Berlin 1994; H. O. Carmesin, "Neurophysics Of Adaption", Physics Essays, 8(1), 38–51, 1995). Even though neural networks are especially well suited for self-adjusting, high resolution image processing, the neural adaptation theory so far has been used neither in determining motion nor in analyzing diffraction reflex sequences in imaging sensors.

The same problems also arise outside the visible spectrum.

The purpose of the invention is to provide a method and apparatus of the initially cited kind allowing accurate determination in practically real time of spatial and/or time intervals in focused image sequences of a lens-diaphragm system and/or of spatial and/or time-related object-parameters such as speed or depth.

The invention is based on the surprising insight that electromagnetic beams focusable in the image plane with a length resolution of about the light wavelength can be modulated with an accuracy of a wavelength in a position-specific manner by a 3D modulator. The electromagnetic beams so modulated subsequently can be detected in a detector of lesser length resolution and the positions in the image plane can be calculated using the position-specific modulation. As a result, the 3D structure of the light field, and hence the 3D structure of objects, can be detected with high accuracy. Illustratively, electromagnetic beams diffracted at a grating assume a direction determined by the crystal orientation corresponding to the condition of reflection and a wavelength corresponding to the Bragg condition.

The advantages offered by the invention are illustratively discussed below for the visible spectrum:

(1) At present the accuracy of determining the intervals, i.e., spacings of a brightness distribution in a focal plane, is bound by the pixel size of an imaging sensor, these pixels being about 20 micrometer (Am). Using a special embodiment of the apparatus of the present invention, that is with a 3D modulator in the form of a 3D diffraction grating, this accuracy will be limited by the wavelength of the light and by the grating spacing. When selecting an optimal grating, such values are about 0.4 $\mu$m. Therefore, the length resolution can be increased by a factor of 50 and the surface resolution by a factor of 2,500.

Such an increase in accuracy is important because the human eye comprises in its retina more than $10^8$ receptors each with a corresponding length resolution of about 1 $\mu$m, because the correspondingly generated cultural environments in the household, at leisure, in traffic and at work are designed for visual systems such as man's, and because future intelligent mobile automatons and robots require comparable visual systems so they may be operated reliably and economically.

(2) The method of the invention allows analyzing by correlation optics and in a simple and economic manner spatial and/or time-related object-parameters such as speeds or depths.

(3) The method of the invention allows universally using algorithms in the form of learning neural networks at appropriately intended sites for particular applications and for corresponding, specific apparatus, without having to develop a new algorithm. Thereby typically occurring development costs are precluded from the beginning.

(4) In the limiting case of large distances from the grating (far field), the theory of diffraction is already very well developed. It is widely used in optics and materials research. On the other hand, the physics of the near field is comparatively complex and is application-specific. Accordingly, the theory might be developed further and to-date no applications are known relating to the determination of motion, while on the other hand the learning, neural networks used herein are applicable on account of flexibility and are especially adequate. Generally, the central significance of flow fields in determining motion has been known since Helmholtz and, moreover, beyond distance of five meters, determining motion from flow fields is advantageous over that from using binoculars, and quite generally visual determination of spatial and/or time-related object-parameters offers the advantage of high resolution, large range, high speed and natural radiation sources when compared to other modes of operation.

(5) A light field in general contains both amplitude and phase information. In most technical visual systems, only amplitude information is used. On the other hand, in the method of the invention and using the 3D diffraction grating, use also may be made of the latent 3D phase information, even when using incoherent light as emitted by natural light sources. Presumably, in natural visual systems, advantageous analysis of phase information in the human eye takes place by means of the 3D diffraction grating of the inverted retina.

(6) In recent decades, explosive development has taken place in neural networks. The essential advantages are parallelism and adaptivity. Thereby, the neural networks are especially well suited to self-adjusting and high resolution image processing in real time even in complex analyses. In a special implementation of the method of the invention, the neural networks may be used at a site where they can in fact perform their best, in the parallel high resolution reconstruction of object-parameters from comprehensive, as modulated as possible, and displaced diffraction patterns.

Further purposes, advantages, features and applications of the invention are elucidated in the following description of illustrative embodiments of the invention and in relation to the attached drawings. All described and/or graphically shown features per se or in arbitrary meaningful combination represent the objective of the invention, even independently of their summary versions in the claims or of relationships between the claims.

Figure 2:
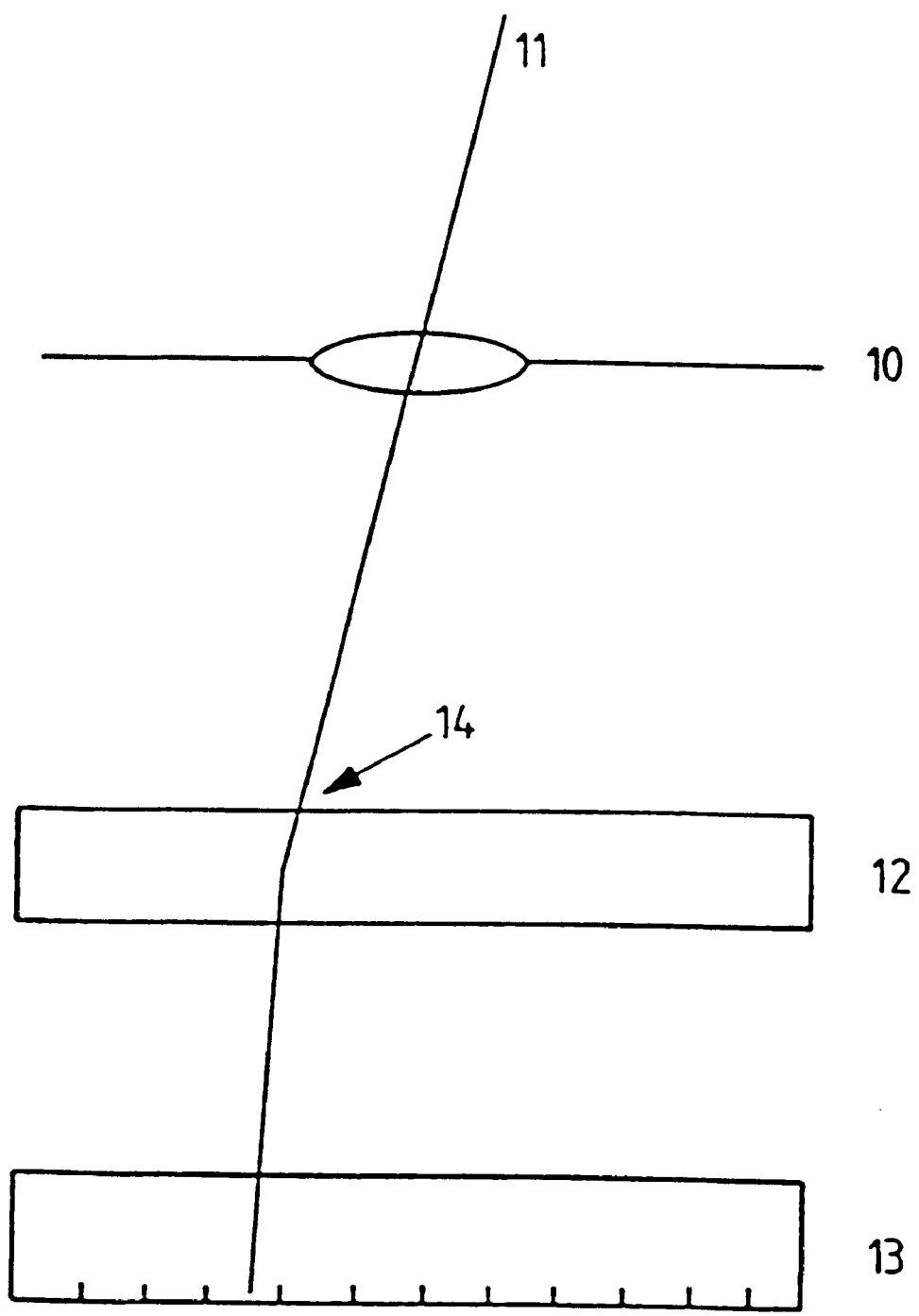
Figure 3:
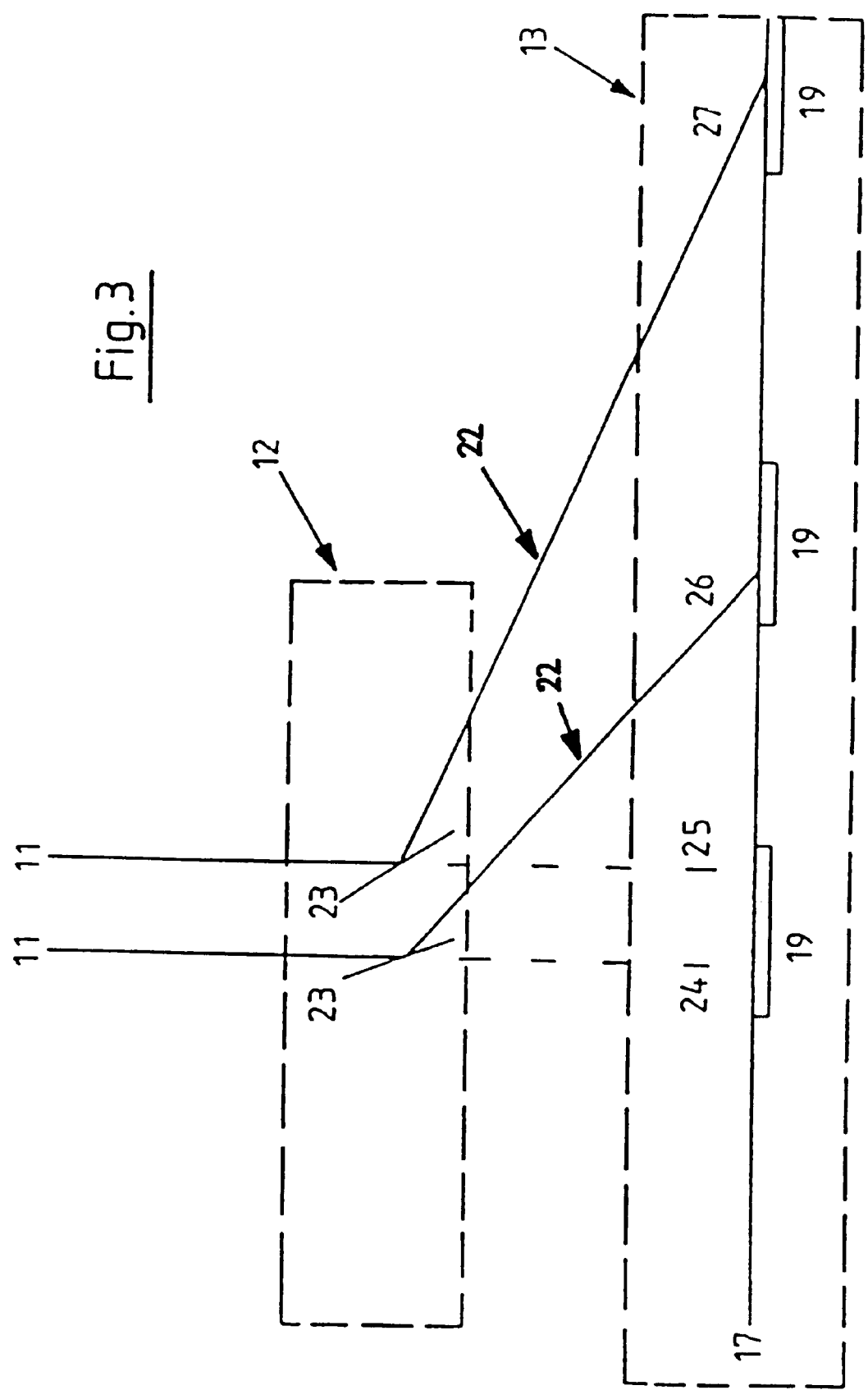
Figure 4:
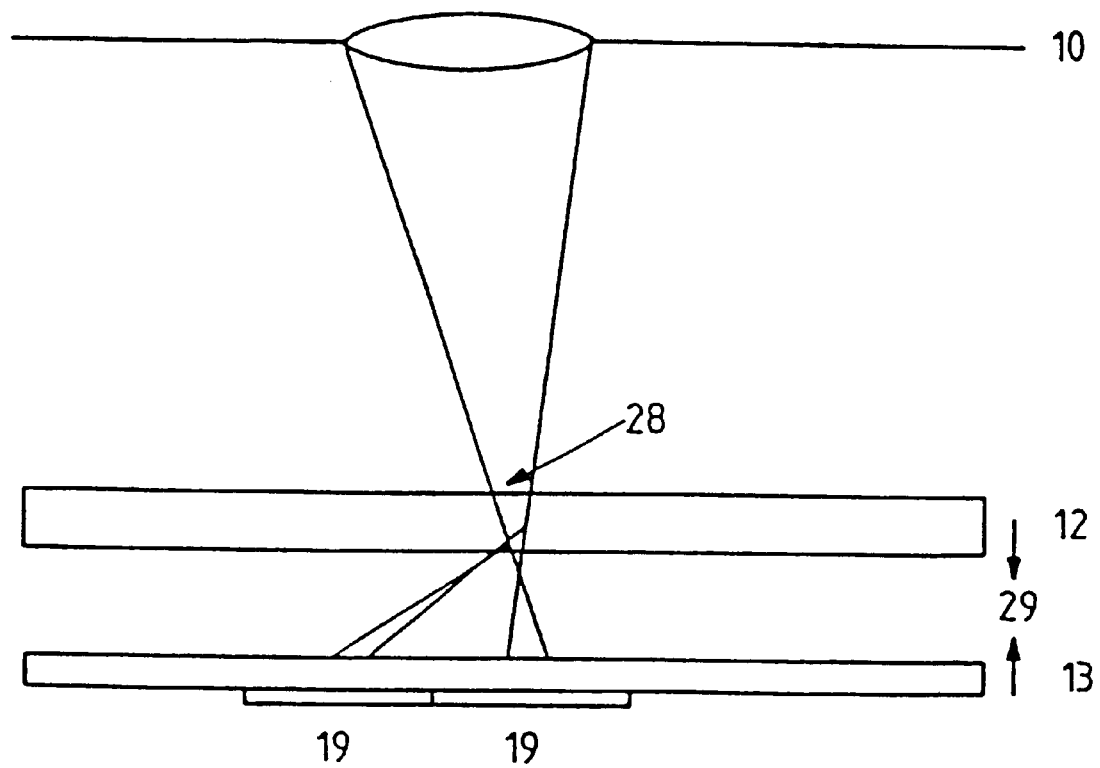
Figure 5A:
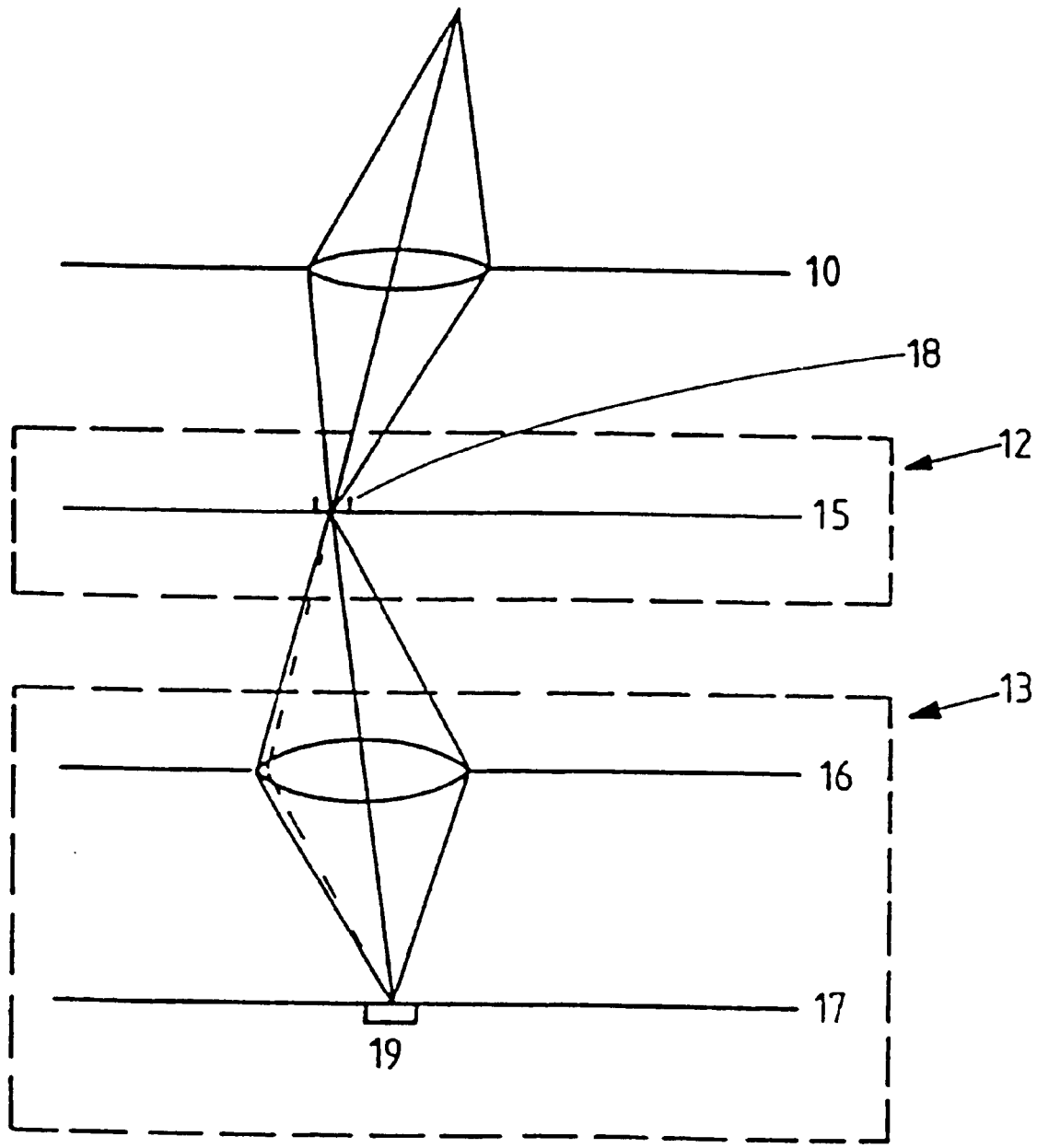
Figure 5B:
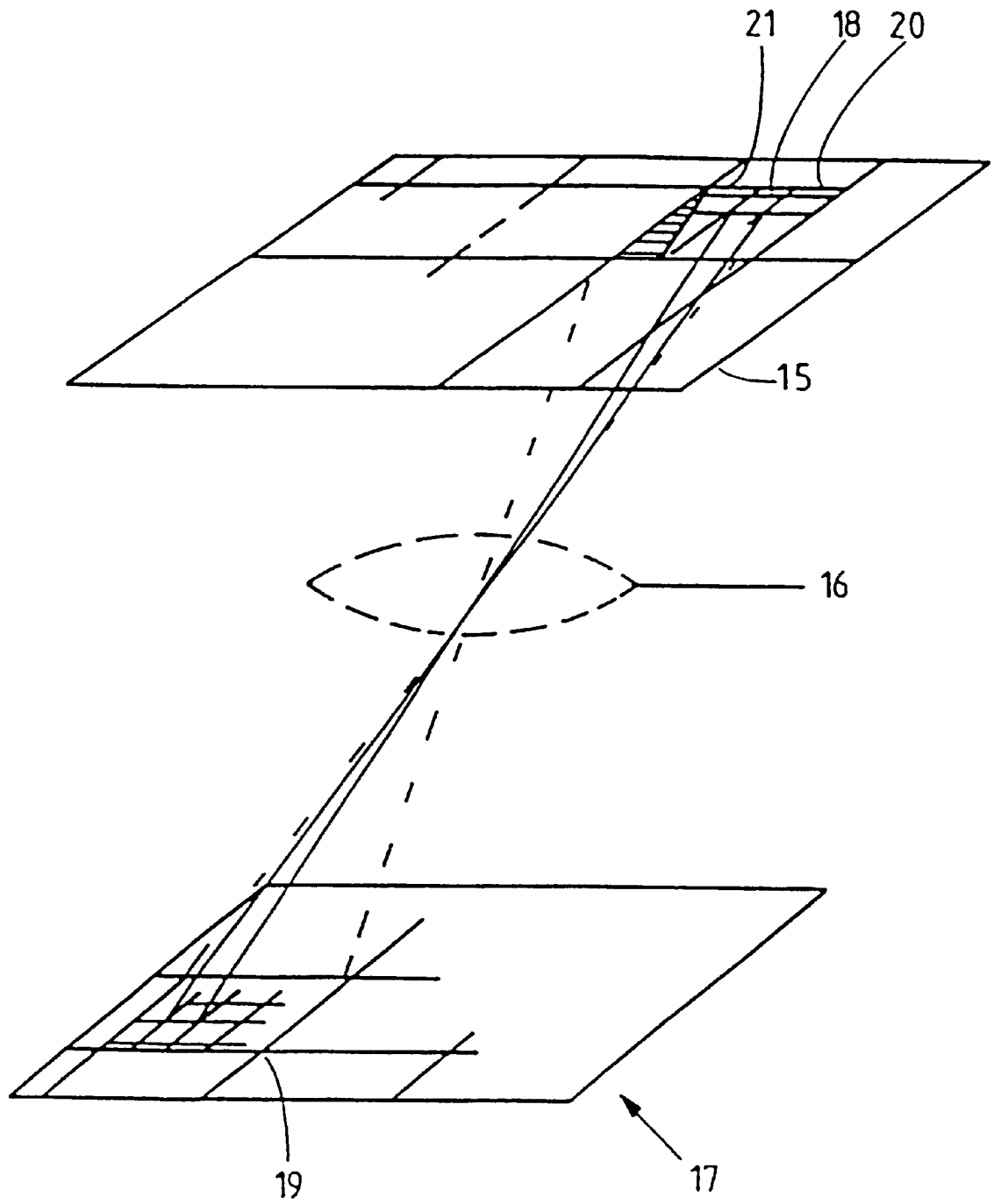
Figure 6:
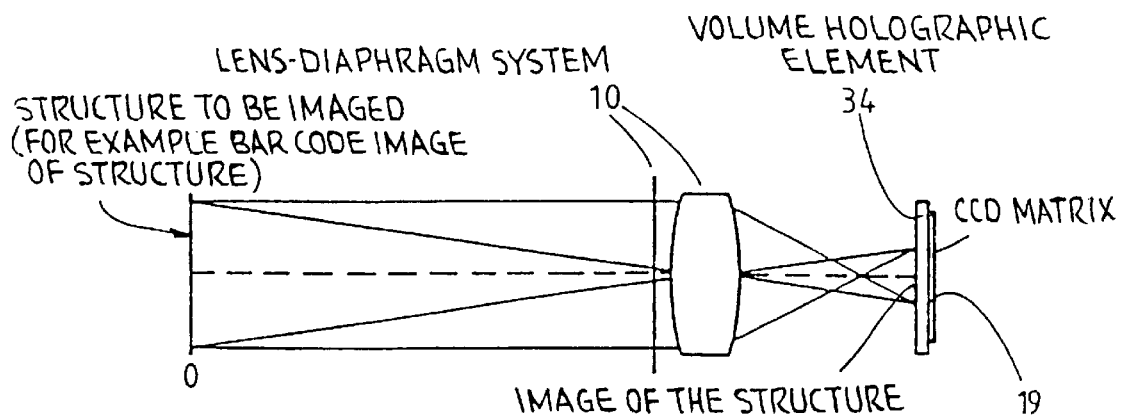
Figure 7:
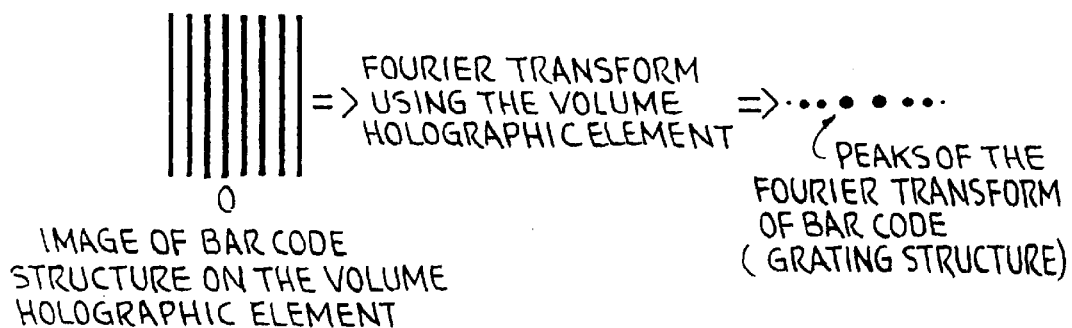
Figure 8:
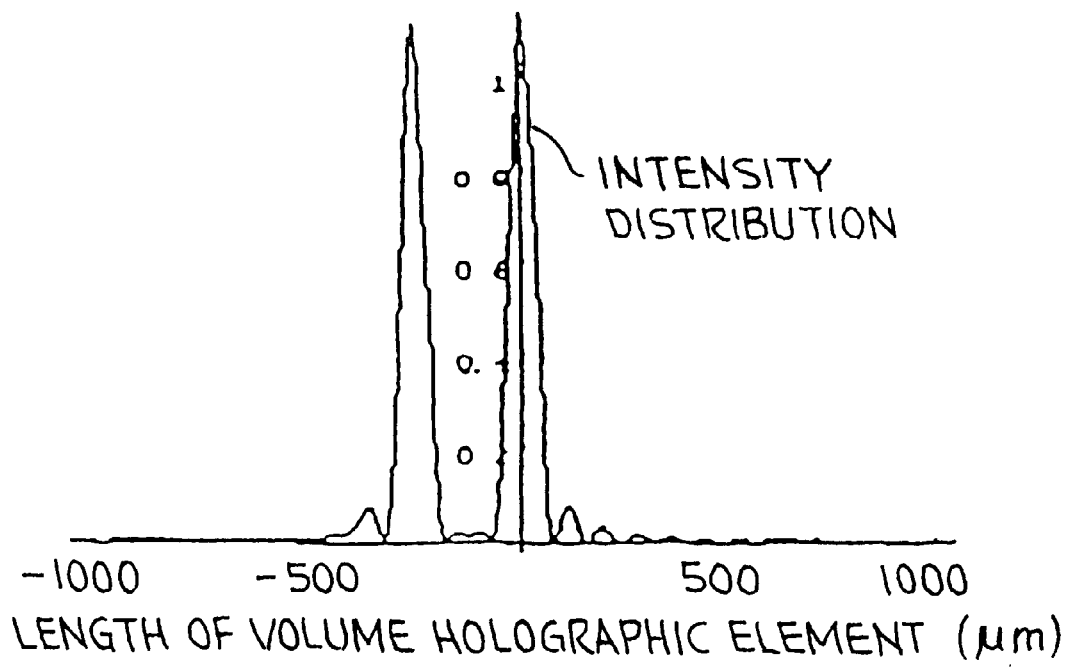
Figure 9:
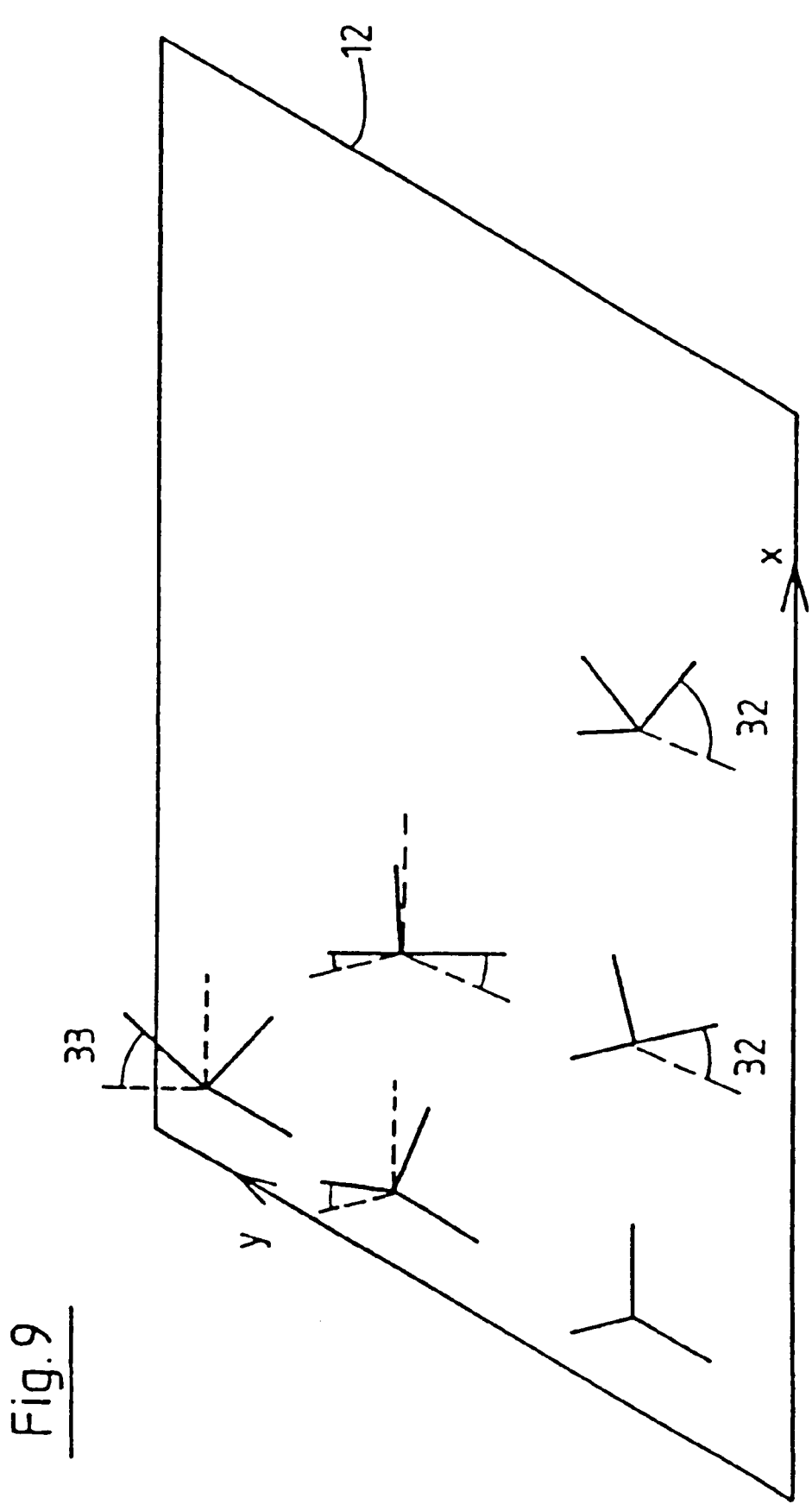
Figure 10:
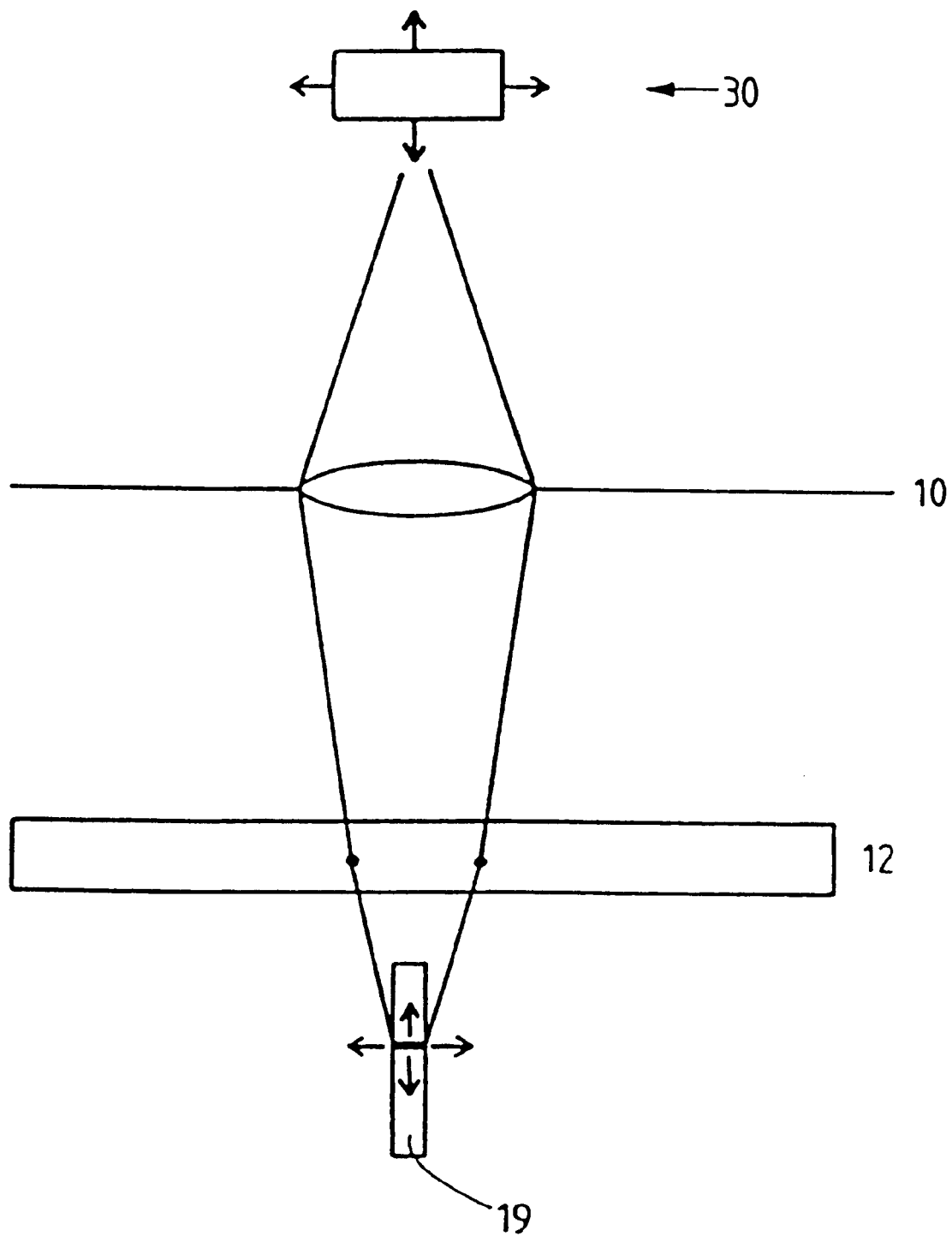
Figure 11:
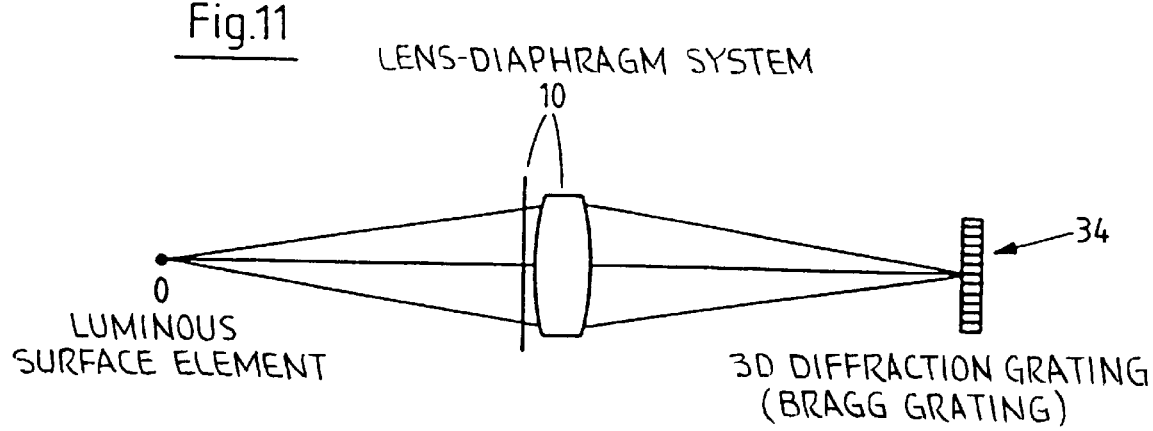
Figure 12:
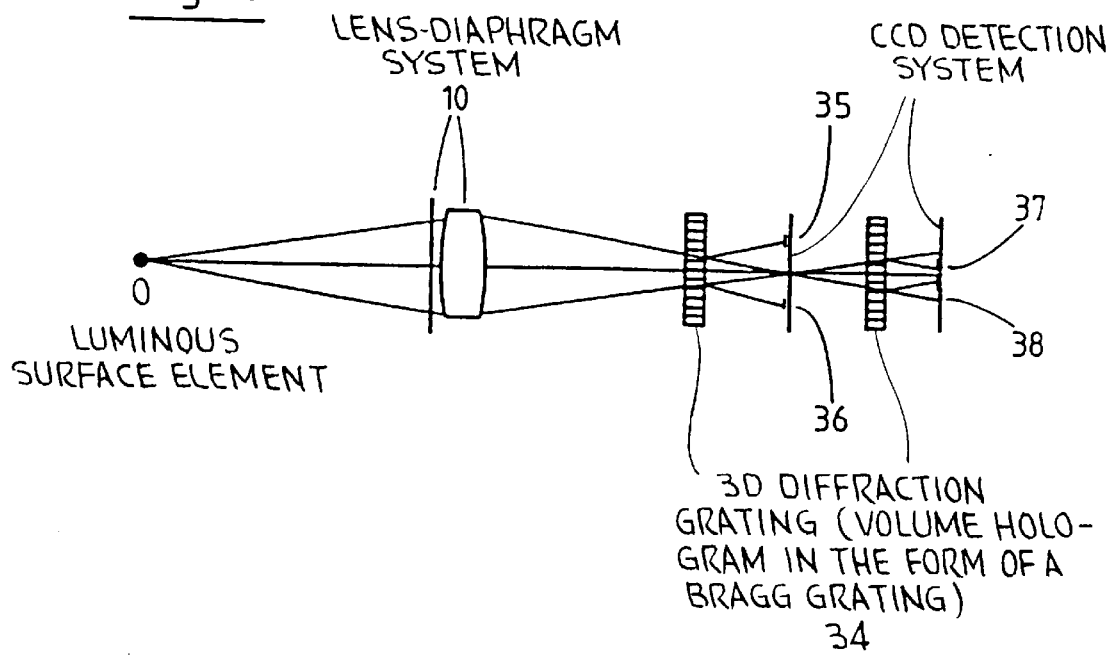
Figure 13:
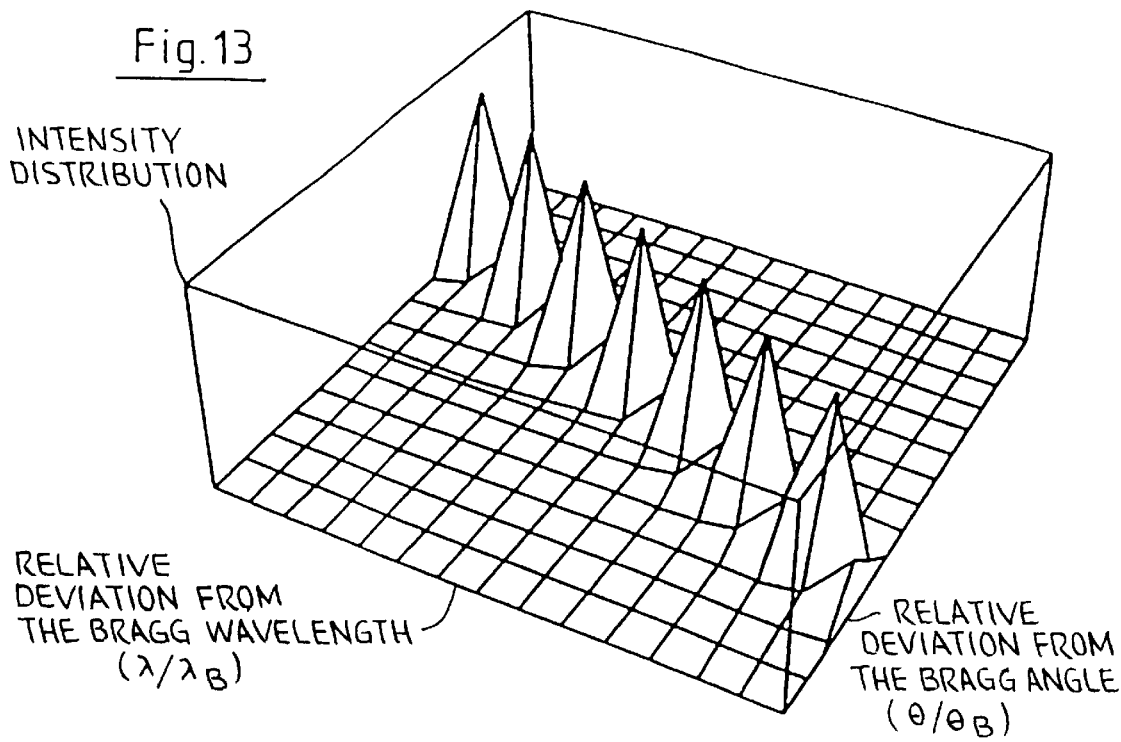
Figure 14:
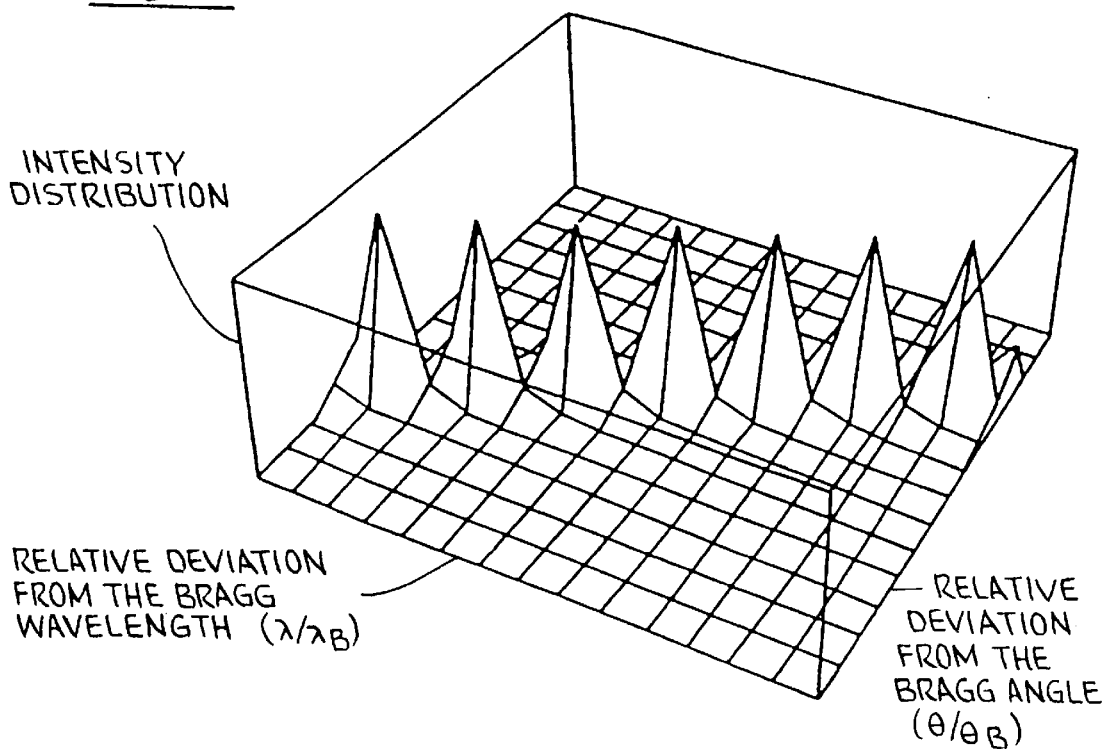
Figure 15:
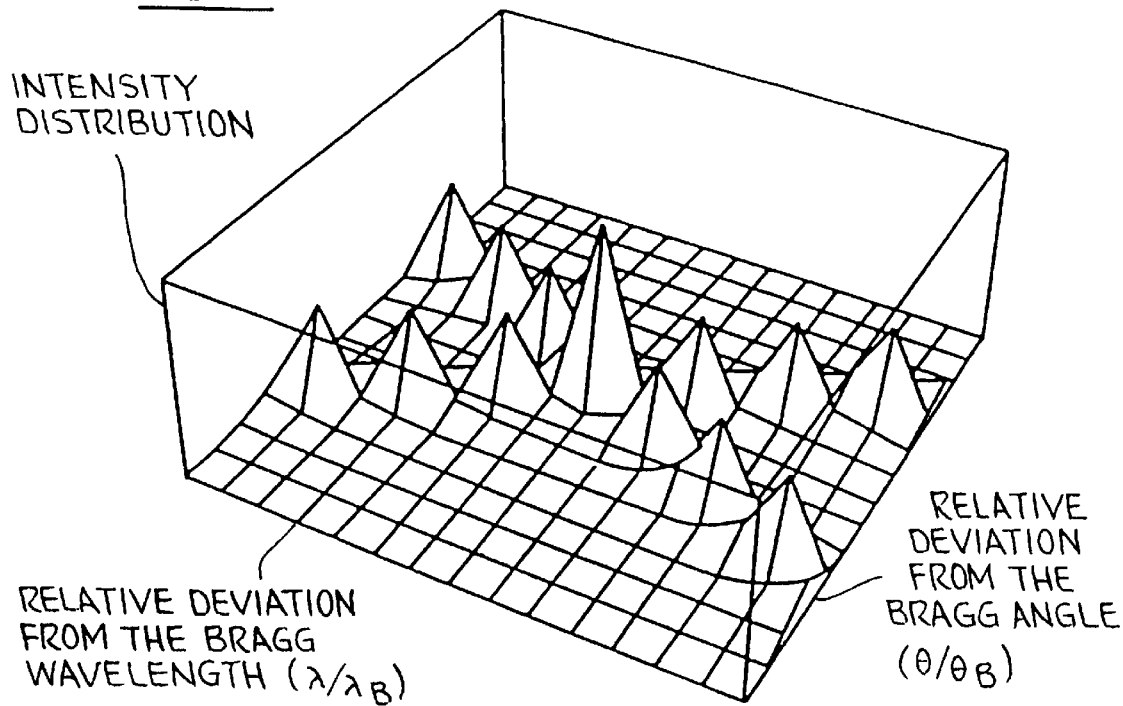
Figure 16:
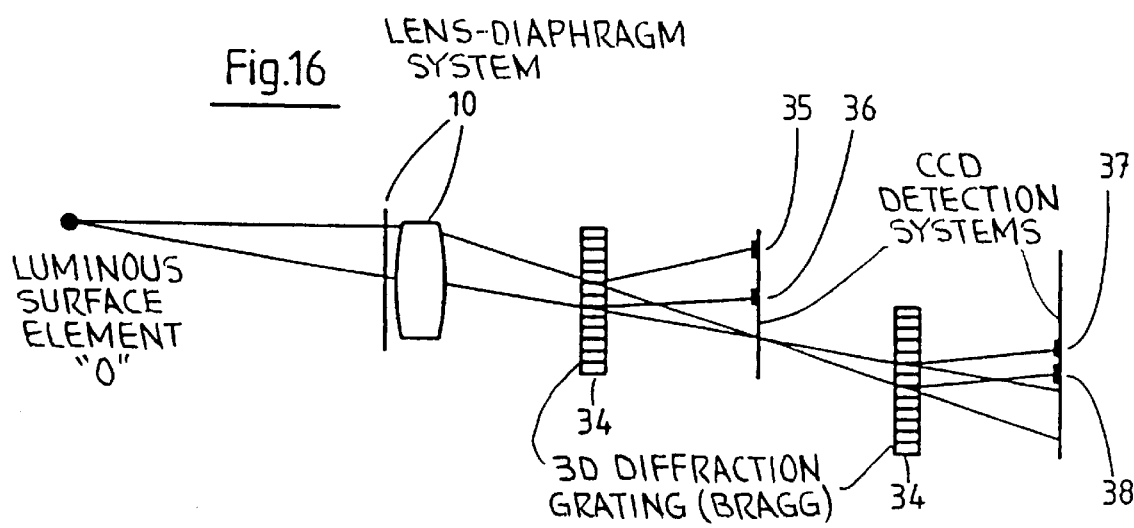
Figure 17:
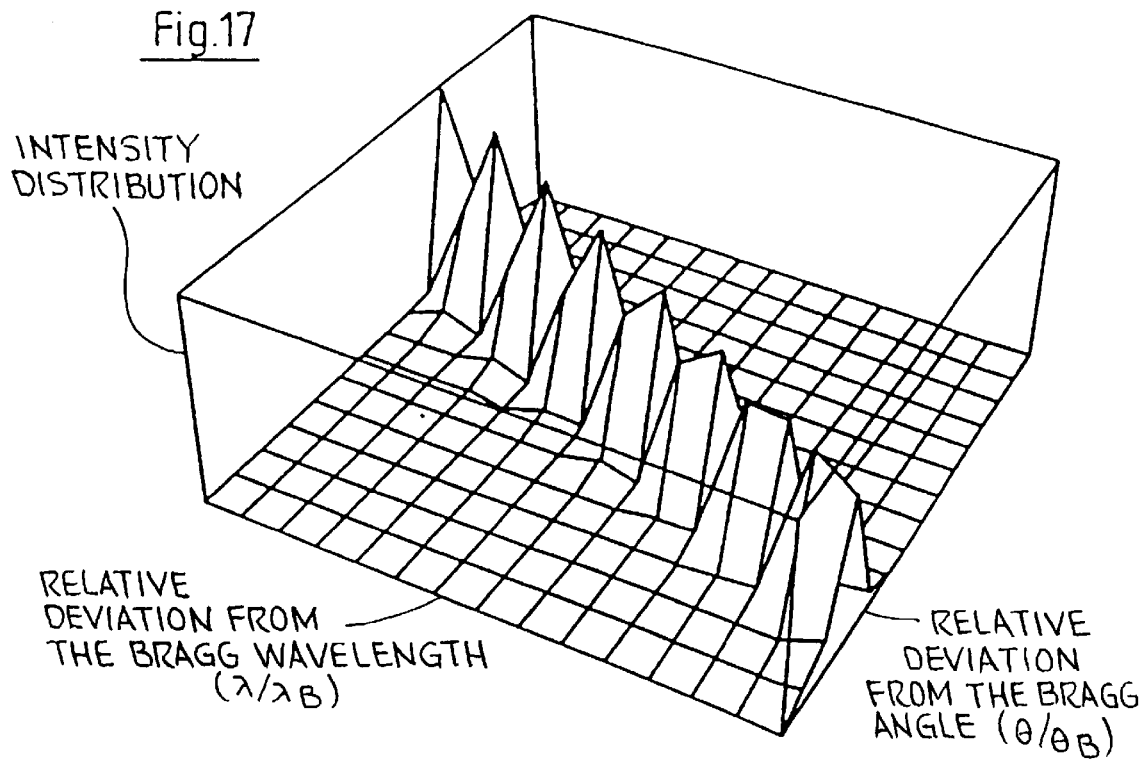
Figure 18:
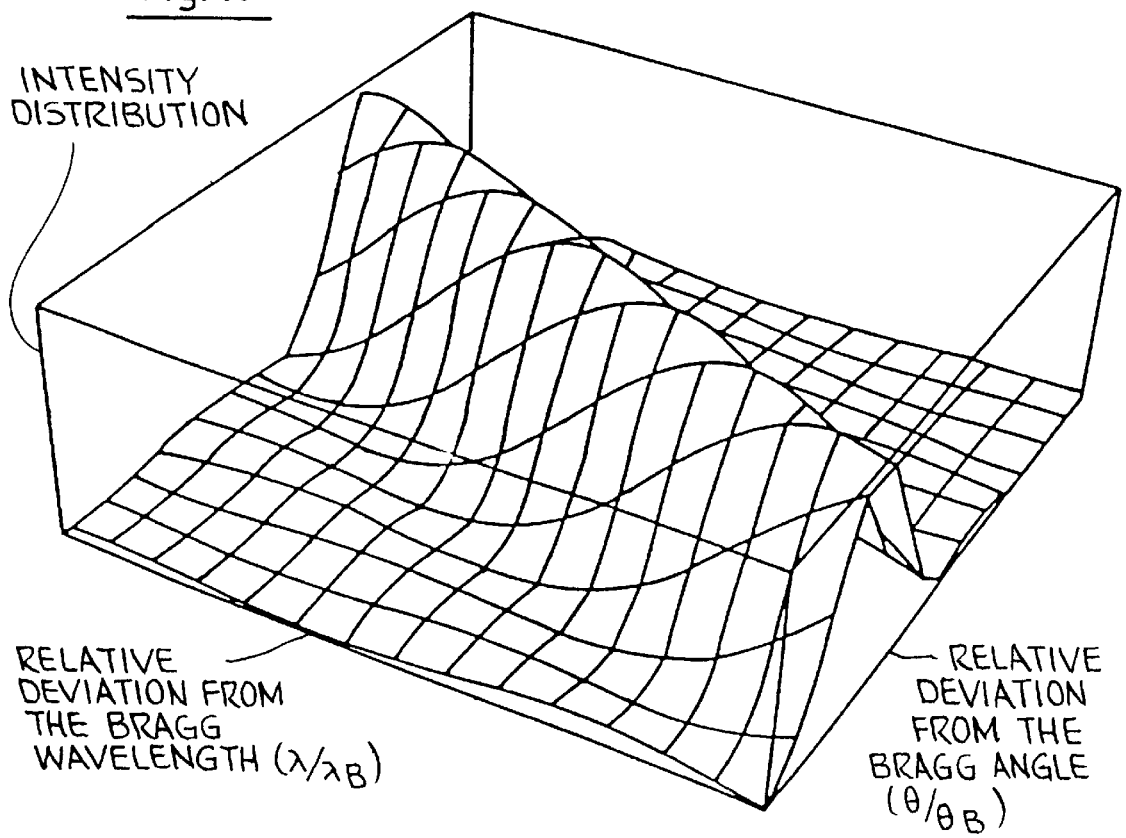
Figure 19:
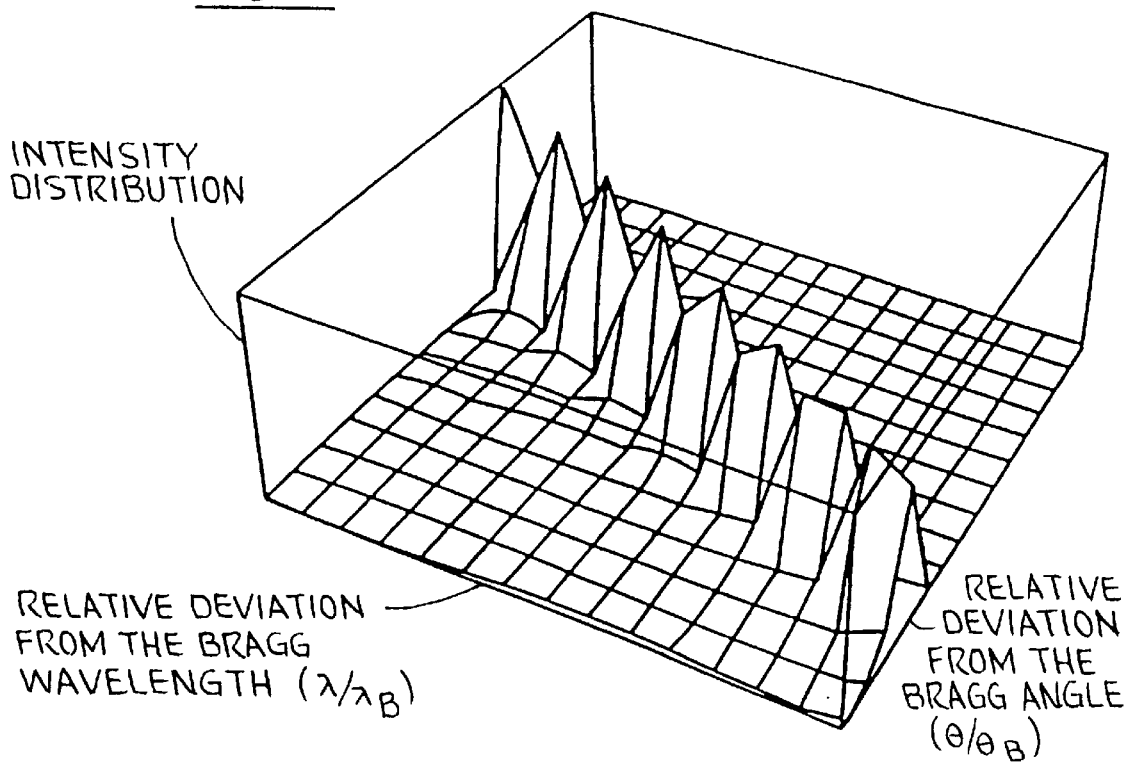
Figure 20:
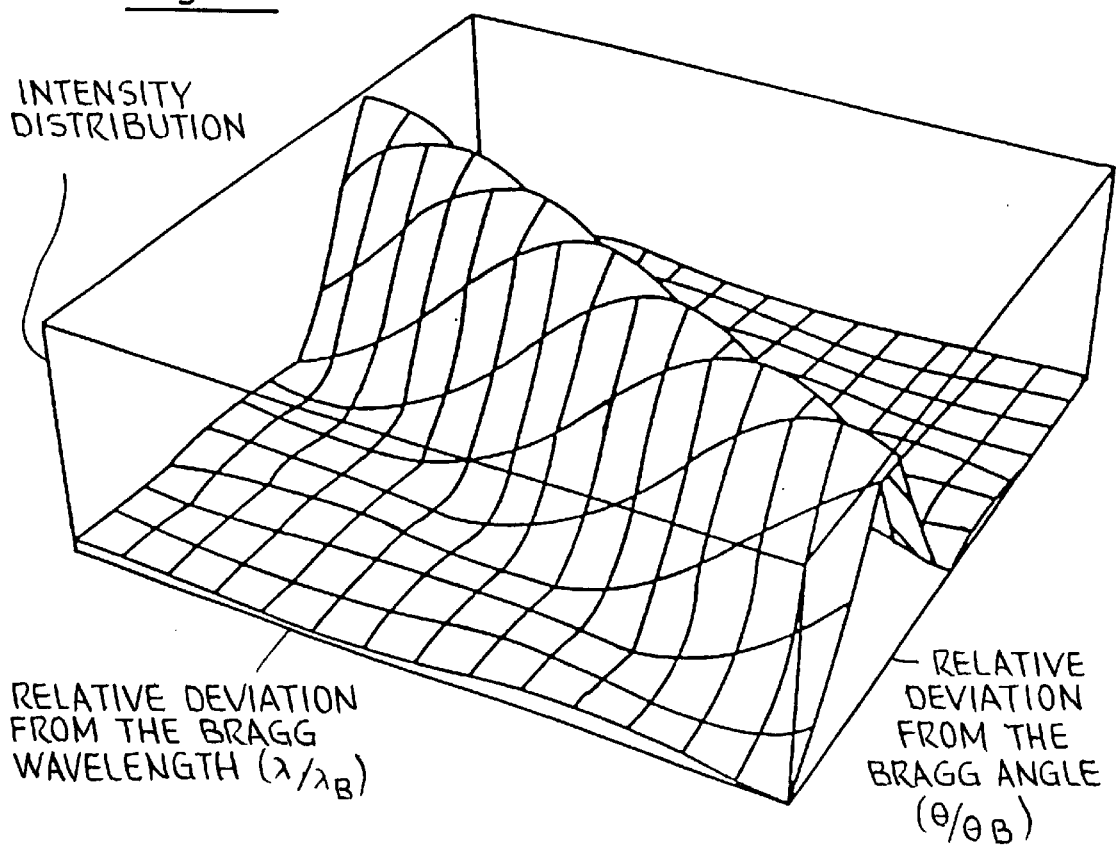
Figure 21:
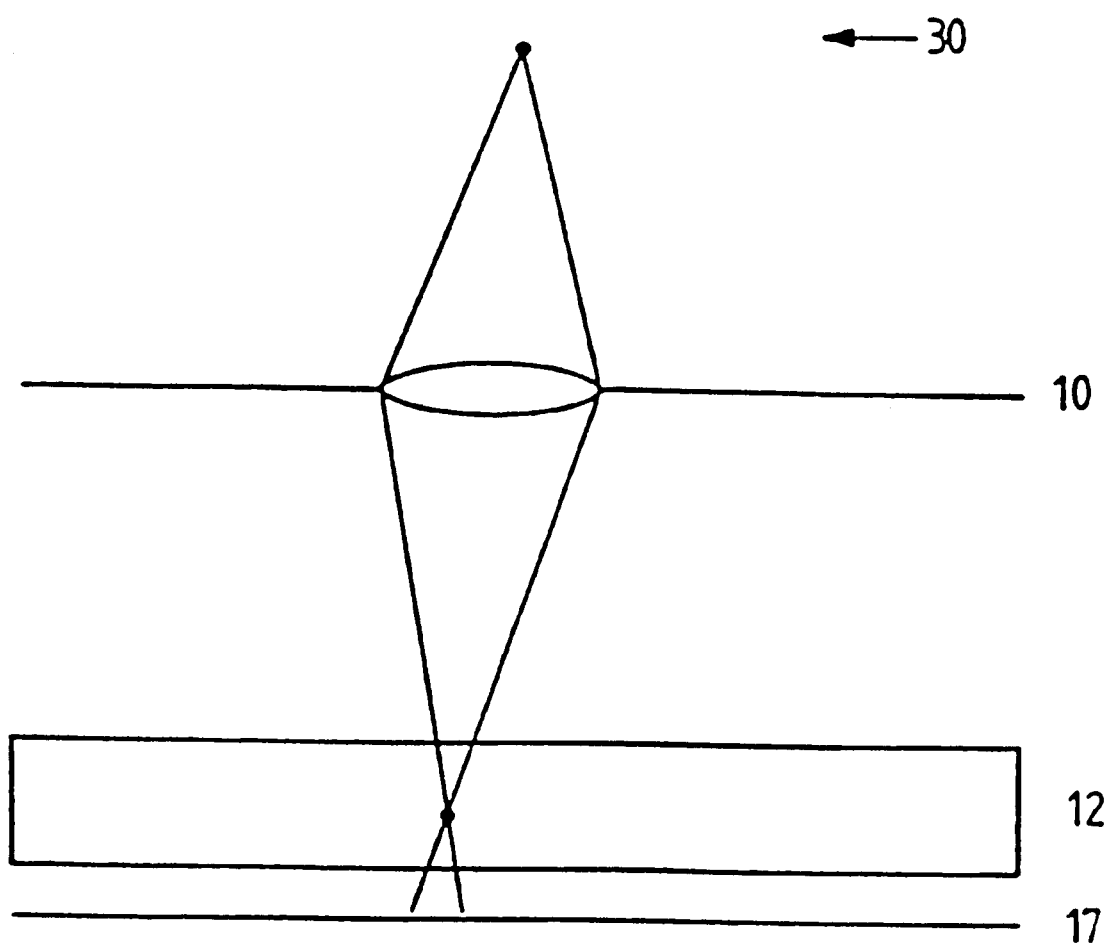

FIG. 1 shows a geometrically/optically imaging lens-diaphragm system with a 3D grating in the image plane, FIG. 2 is a schematic of a possible embodiment of apparatus of the invention, FIG. 3 shows a concrete embodiment of the apparatus of the invention, FIG. 4 schematically shows the imaging and resolving configuration of a concrete embodiment of the apparatus of the invention, FIG. 5a shows a further embodiment of the apparatus of the invention, FIG. 5b is a detail of FIG. 5a, FIG. 6 is an illustrative embodiment of a pattern Fourier-Transform, FIG. 7 shows the Fourier-Transform using a volume holographic optic element, FIG. 8 shows the Fourier Transform of a bar structure generated by means of the volume holographic element of FIGS. 7 and 8, FIG. 9 shows the configuration when using a curved 3D diffraction grating of a further embodiment of the apparatus of the invention, FIG. 10 schematically shows the state when implementing a learning phase of one implementing mode of the method of the invention, FIG. 11 shows an illustrative embodiment to determine a depth card using the 3D Talbot effect, FIG. 12 shows the configuration of the 3D diffraction grating with detectors relating to the illustration of FIG. 11, FIGS. 13, 14 show the intensity distributions at the Bragg grating in front of the focal point, FIG. 15 shows the superposition of the intensity distributions at the Bragg grating behind the focal point, FIG. 16 shows the design of the 3D diffraction grating with detector elements in relation to the configuration of FIG. 11, however when using white light and the luminous element being off-axis, FIGS. 17, 18, show the intensity distribution of the Bragg grating before the focus of FIG. 16, FIGS. 19, 20 show the intensity distributions for the Bragg grating behind the focus, and FIG. 21 shows a configuration relating to the 3D Talbot effect.

The geometric-optics imaging lens-diaphragm system 10 of FIG. 1 images an object 0 on the image plane 14 of the system 10. A 3D grating 12 with grating constants $g_1$, $g_2$ and $g_3$ in the x-, y- and z-directions is mounted in the image plane 14. This grating 12 transforms the imaging, or the image of the object O in the Talbot plane, in the near field behind the grating 12. Therein the interference maxima are located on concentric circles and will be processed further by appropriate detector elements 19 or photosensors of a detection system 13. The resultant chromatic interference maxima on three circles in this example correspond to the red (R), green (G) and blue (B) color duct of human vision with respective wavelengths $\lambda_{max}$=559, 537 and 447. In FIG. 1, diffraction orders are numbered 111 for red (R), 122 for blue (B) and 123 for green (G).

FIG. 2 diagrammatically shows apparatus of the present invention. It comprises a lens-diaphragm system 10 focusing an incident light (here denoted by a beam 11), further a 3D modulator 12 for position-specific modulation of the light beams and located in the vicinity of the focal plane of the lens-diaphragm system 10 and in front of a detection system 13 mounted behind. The light beam 11 is incident on lattice planes at the site 14 (point of origin) in the 3D modulator 12 and is modulated by the Bragg condition regarding its direction of propagation and its chromatics.

In an illustrative manner, the known von Laue equation for 3D gratings describes the constructive interference in a direction of an order of diffraction by the following conditions:

$$g_1(\cos\alpha - \cos\alpha_0) = h_1 \lambda$$

$$g_2(\cos\beta - \cos\beta_0) = h_2 \lambda$$

$$g_3(\cos\gamma - \cos\gamma_0) = h_3 \lambda$$

where $g_1$, $g_2$ and $g_3$ are the lattice constants in the x-, y-, and z-directions, $\alpha_0$, $\beta_0$, $\lambda_0$ are the incident apertures of the light cones, $\alpha$, $\beta$, $\lambda$ are the angles of reflection of the order of diffraction, $h_1$, $h_2$, $h_3$ are integral mathematical triples, $\lambda$ is the wavelength.

When solving the three equations for X for a 3D cubic grating element ($g_1$, $g_2$ and $g_3$=g), there follows $$\lambda = \frac{2h_3 g}{h_1^2 + h_2^2 + h_3^2}$$

If g=0.75 µm and the light is incident perpendicularly ($\alpha_0=\beta_0=90°$, $\gamma_0=0°$), the wavelength γ is 500 nm in the 111 direction of the order of diffraction.

FIG. 3 is a concrete embodiment of the apparatus of the invention. A 3D modulator 12 is present in the form of a device for a position-specific deflection 22 with deflecting elements 23 in the form of lattice planes only two of which are shown.

The light beam 11 is incident on two lattice planes 23 in the 3D modulator 12 and is directed onto two detector elements 19 according to the Bragg condition for its direction of propagation and its chromatism (wavelength). Illustratively, the wavelength λ follows from the von Laue equation for a 3D cubic lattice element, $$\lambda = \frac{2h_3 g}{h_1^2 + h_2^2 + h_3^2}$$

namely λ being 500 nm for a perpendicularly incident white light beam in the 111 direction of the diffraction order and λ being 409 nm in the 113 direction of the order of diffraction, both in transmission and reflection.

Another embodiment wherein the 3D modulator 12 produces a trichromatic signal in the RGB (red/green/blue) color space corresponding to the spectral brightness sensitivity curves of human daylight vision is implemented by using a hexagonal 3D lattice element as the 3D modulator. The von Laue equation is given below for a hexagonal 3D lattice element (hexagonal tightest-packed spherical lattice elements in Cartesian coordinates), $$\lambda = \frac{2h_3}{g_3 \left( \frac{h_1^2}{g_1^2} + \frac{h_2^2}{g_2^2} + \frac{h_3^2}{g_3^2} \right)}$$

With perpendicularly incident light beam 11 and lattice constants $g_1$, $g_2$, $g_3$ respectively=2λ, 4λ/√3, 4λ, and λ=559 nm in the $h_1 h_2 h_3$ diffraction orders 111 (red), 123 (green) and 122 (blue) the wavelength triple 559/537/447 nm which corresponds to the maximal brightness sensitivity of the photo pigments in the human retina cones. This lattice optics result is illustrated in FIG. 1. At a reduced number of lattice planes in the 3D modulator, a spectral gaussian bandpass feature is produced around this $3\lambda_{max}$ at positions of the interference maxima in a plane of observation behind the 3D lattice intersections of three concentric circles and families of hyperbolas crossing at less than 60°. In FIG. 1, the gaussian bandpass feature for $3\lambda_{max}$ (green, blue, red) is indicated by the density of the shading in the light guides 19.

In another embodiment, moreover, all deflecting elements 23 may be in the form of semi-transmitting micro-mirrors which additionally impart the color red to the transmitted light beams 24 and 25. The local brightness maximum of other than red beams, namely reflected light beams 26 and 27, is associated with enhanced accuracy to each local red brightness maximum in a detector element 19. Their position in the detector array 17 allows inferring the point of origin in the 3D modulator 12.

Illustratively, time intervals in focused image sequences may be ascertained by associating each red local brightness maximum in a detector element 19 to the pertinent local brightness maximum of the subsequent time and thus to compute the speed of the local brightness maximum. This speed is used to estimate the increased speed of the deflected light beams. A highpass filter is adjusted and in this manner the deflected light beams 26 and 27 are measured with enhanced accuracy. The point of origin in the 3D modulator 12 is then determined from the positions of the beams in the detector array 17.

The present invention allows increasing the accuracy by means of bit multiplication per modulation, namely in a manner discussed theoretically as follows: a light beam which without 3D modulation only contributes in bright/dark form to the determination of spatial and time intervals and object-parameters, according to information theory will contribute one bit. By modulating the three colors red, green and blue each time by an additional bit, the number of bits has been tripled. Calculating in a manner to reproduce these bits also in the specific spatial and time intervals and object parameters yields a three-bit increase in accuracy, that is, almost by one decimal point. This relationship will be elucidated by means of a concrete embodiment.

The apparatus of the invention shown in FIG. 4 includes the following parameters: The lens-diaphragm system 10 when using a deflection system 12 and in the presently selected embodiment has a focal length of 17 mm and a stop diameter of 4 mm. An aperture angle of 6.7° and an Airy disk diameter 28 of about 5 µm ensue. The distance 29 between the 3D modulator 12 and the detection system 13 is 20 µm. Let the size of a detector element 19 be 20 µm.

As a result, the number of the affected detector elements 19 is doubled lengthwise and the number of the detector elements 19 affected in the plane is quadrupled and thus the bit number also is quadrupled. Accordingly, when knowing the pertinent technical data of an actual application, definitive measurement improvement is to be expected.

FIG. 5a shows another embodiment of the apparatus of the present invention. A 3D modulator 12 is located in the focal plane behind a lens-diaphragm system 10 and comprises a modulation filter 15 consisting of filter elements 18. A detection system 13 also mounted behind the 3D modulator 12 comprises a second lens-diaphragm system 16 to focus the modulated light beams and also an imaging detector array 17 of detector elements 19.

FIG. 5b shows an enlarged detail of FIG. 5a. The modulation filter 15 in the focal plane of the lens-diaphragm system 10 of FIG. 5b comprises position-specific filter elements 18, for example in the form of a random-dot distribution. The modulated light beams are measured by the imaging detection system 17 of detector elements 19. In principle, this embodiment is a prototype for all modulations of imaging elements by the 3D modulator 12. The calculation of the accurate position of an edge element 21 in the beam path immediately before the 3D modulator 12 is carried out as follows:

Let the brightness $H_i$ at a filter element 18 be null at the edge element 21 and let it vary over the remaining filter elements of coordinates $x_i$ and $y_i$ of the original 20 of a detector element 19 as follows, $$H_i = y_i - mx_i - b. \tag{1}$$

Therein mx is the increase, b the axis' intersection by the edge element 21.

Assume the filter elements 18 either are transparent, namely $F_1=1$, or opaque in the x-polarization direction, when $F_1=0$. The filter elements $F_1$ are assumed selected at random. The brightness $H_j = S_{i \in Ij} H_i$ as well as the brightness $H_j^P = S_{i \in Ij} F_i H_i$ behind the polarization filter (not shown), and opaque in the y-direction, are measured. Using equation (1), the following holds $$H_j = \sum_{i \in Ij} y_i - mx_i - b, \tag{2}$$

here $x_i$ and $y_i$ are known by design and $H_j$ is measured, and $$H_j^p = \sum_{i \in Ij} F_i(y_i - mx_i - b) \tag{3}$$

where $F_i$, $x_i$ and $y_i$ are known from the design and $H_j^P$ is measured. As a whole, equations (2) and (3) are a linear set of equations with two unknowns, m and b, being linearly independent because of the random filter elements $F_i$. Therefore, m and b and, hence, the position of the edge element 21, can be calculated directly.

Illustratively, the exact determination of the position of an edge element 21 can advantageously be carried out using a 3D modulator 12, provided the aperture of the lens-diaphragm system 10 is relatively large so that the image of the edge element 21 behind the lens-diaphragm system 10 is sharper than can be detected by the detection system 17. In such a case, the light intensity in the focal plane behind the second lens-diaphragm system 16 is determined in accordance with Kirchhoff's boundary condition by the position of the filter elements 18 in the 3D modulator 12. This light intensity is measured by the detector elements 19 and can be used for the accurate computation of slope m and axis intersection b of the edge element.

An illustrative implementation of the Fourier-transformation of a pattern by the 3D modulator is described below in relation to FIGS. 6 through 8.

An optical volume holographic element 34 created by optical holography or other special techniques, such as light-beam, electron-beam, ion-beam techniques, for example, is located in the invention behind the lens-diaphragm system 10 at the site of the 3D modulator 12 of FIG. 1, several Bragg diffraction gratings having been superposed in the element as shown in FIG. 6.

Using the optics (lens-diaphragm system 10), a structure 0 (for example, a bar structure or a checkerboard pattern) is imaged on the volume holographic element 34. The detector element 19, for example designed in the form of a CCD receiver constituting the electronic retina, is located immediately behind the volume holographic element 34. The element is designed in such a manner that the Fourier Transform of the image of a structure 0, for example that of a bar, is produced directly behind the element as shown in FIG. 7.

If a volume holographic element 34 is used wherein more than twenty Bragg gratings are superposed in different spatial directions and wherein the slopes of the individual Bragg gratings differ in angular positions, the thickness of the volume hologram being 250 μm and the index of refraction of the material into which the Bragg gratings were inserted being 1.5 for the wavelength of the HeNe laser, then the Fourier Transform will show a bar structure corresponding to that of FIG. 8 (two-dimensional representation).

The illustrative embodiment of FIG. 8 allows recognizing, i.e., differentiating, between patterns (in particular bar codes and checkerboard patterns) in real time.

An embodiment for processing images or sequences of images using neural networks is described below.

FIG. 9 shows the configuration when using a curved 3D diffraction grating in the x-y plane of a 3D modulator 12 wherein the grating elements, represented by local coordinate systems, are rotated by an azimuth angle 32 proportional to the x-coordinate and about a polar angle 33 proportional to the y-coordinate. By means of the color determined by the Bragg condition, the associated diffracted light beams are associated to each local brightness maximum of zeroth order of diffraction. The azimuth and polar angles are determined by the position of the diffracted light beams. The x- and y-coordinates of the original site in the 3D modulator 12 are determined with enhanced accuracy from the azimuth and polar angles.

If an uncurved 3D diffraction grating located in the x-y plane of the 3D modulator is used, then each local brightness maximum of the zeroth diffraction order is assigned the associated diffracted light beams by means of wavelength determined by the Bragg condition. On the basis of the position of the zeroth diffraction order and of the higher diffraction orders, the position of the original site in the 3D modulator is determined to one pixel accuracy because of data redundance and using an appropriate interpolation procedure.

Advantageously the following steps will be carried out:

An edge element 21 corresponding to FIG. 5b is used as a sharply defined pattern, and an uncurved 3D diffraction grating. For a given detector element 19, the resultant diffraction patterns are determined in a detection system 17 for all positions and orientations of an object 30 and of the detector elements 19 (see FIG. 10) and the relation of position and orientation to each diffraction pattern is stored. Because of the translational invariance of the uncurved 3D diffraction grating, this relation shall be used for each detector element 19.

The patterns or other significant 3D features are advantageously selected to be sufficiently large and different for good distinction between the resulting signal patterns of the detector elements to make irrelevant the crosstalk known from the theory of neural networks. Furthermore, the patterns or significant features are selected to be comparatively different for such purposes, that is having relatively little overlap in the sense of neural-network theory. In general, such application of neural networks allows recognizing relations between spatial and/or time-related object-parameters of stationary and/or moving 3D features and the resulting signal patterns of the detector elements 19, when using perception learning algorithms and neurons with several multilinear couplings, that is couplings between two, three, four etc. neurons. In particular the network can learn these relations also in the absence of conventional calculation rules and/or algorithms. In complex learning tasks relating to the assignments arising in this respect, a Perceptron learning algorithm with couplings between a maximum number of neurons matching the complexity of the learning task, and for which a valid proof of convergence for the learning tasks exists, must be used. Such learning algorithms and convergence proofs are discussed in H. O. Carmesin, "Neuronal Adaptation Theory", 1996, ISBN 3-631-30039-5.

Taking into account the ever-limited memory capacity of neural networks, first the most important, significant features and patterns are defined and the pertinent assignments are stored in the network. When storing further assignments of other significant features and/or patterns, quality of recognition is tested each time. If the quality drops, storage capacity apparently has been exhausted. Then, a network with more neurons will be used.

An illustrative embodiment to determine a depth card using a 3D Talbot effect in focused light is described below in relation to FIG. 21.

First, an arbitrary point of the object is imaged in such a manner by the lens-diaphragm system 10 that the associated focus is placed in the 3D modulator 12. The 3D modulator 12 consists of layers of planar gratings, hereafter also called planar gratings, preferably configured perpendicularly to the optic axis of the lens-diaphragm system 10. An image of the particular planar grating located near the focal plane is formed by self-imaging (Talbot effect) in the plane of the detection system 13 formed of several detector elements 19 and which can be placed an arbitrary distance behind the 3D modulator 12 and perpendicularly to the optic axis of the lens-diaphragm system 10. Thereby the planar grating is enlarged by the ratio of the distance between focus and detection system to the distance between focus and planar grating. This is the same ratio by which the planar grating in the form of a shadow would be enlarged behind the focus if a conventional shadow would arise.

The grating image is detected by the elements 19 of the detection system 13. If there was only one object point, the enlargement of the planar grating would be measured thereby, and on its basis together with the above enlargement ratio, the 3D position of the focus would be computed and, working backward, then the 3D position of the focus would be used together with the imaging properties of the lens-diaphragm system 10 to determine the 3D position of the object point. But because in general many object points are present, the procedure, still the same in principle but different in detail, shall preferably be as follows: The detection system is divided into detector elements 19 for purposes of computation. The Fourier spectrum of the image is determined for each detector element 19. On this basis, the imaged grating constant is calculated. The result is used to compute the enlargement ratio (factor) of the planar grating. In this process, the particular planar grating is advantageously identified because each planar grating in the 3D modulator 12 has its own orientation which is recognized in the Fourier spectrum. The 3D position of the particular focus is determined for each detector element 19 from the enlargement ratio of the identified planar grating and thereby also the 3D position of the associated focus. These 3D positions of the object points in particular contain a depth card.

An illustrative implementation of a depth card determined in a volume-holographic manner is described below in relation to FIGS. 11 through 20.

Instead of the 3D modulator 12 of FIG. 1, a 3D diffraction grating 34 manufactured by volume holography or other specialized techniques (for example, light-beam, electron-beam, ion-beam techniques, etc.) with the properties of a 3D Bragg grating is mounted behind the lens-diaphragm system 10 of FIG. 11.

By changing the spacing and the direction of a surface element 0 mounted in front of the lens-diaphragm system 10 and emitting white light, intensity distributions are generated behind the 3D diffraction grating 34, the spectra and the positions of the distributions allowing determination of the direction and distance of a surface element 0 which is luminous by reflection or its own luminosity. A depth card may be set up with the data so obtained.

FIG. 12 shows the configuration to measure the intensity distributions. The intensity distributions are measured, using the detector elements 35, 36, at Bragg gratings in front of the focus and by detector elements 37, 38 at Bragg gratings behind the focus. The focus positions in front of and behind the 3D diffraction gratings or the volume hologram in the form of a Bragg grating 34 are caused by different distances of the luminous surface element 0 in front of the lens-diaphragm system 10.

The spacing between the Bragg grating 34 and the detection plane is adjusted in such a manner that the intensity distributions will superpose at the site of the detector elements 37 and 38.

FIG. 13 shows the intensity distribution measured at the detector element 35.

FIG. 14 shows the intensity distribution at the detector 36 and FIG. 15 the superposition of the intensity distributions at the detectors 37 and 38.

Analysis of the intensity distributions at the detectors 35 through 38 allows accurate determination of the spacing of the luminous surface element 0 in front of the lens-diaphragm system 12.

FIGS. 16 through 20 show the conditions illustrated in FIGS. 11 through 15 for the case of white light and off-axis positions of the luminous surface element 0.

The spacing and the direction of the luminous surface element 0 in front of the lens-diaphragm system 10 can be determined from the spectral distribution and position of the intensity distributions behind the Bragg grating 34 in the plane of the CCD detection system 35 through 38. FIG. 21 shows a 3D Talbot-effect configuration.

REFERENCE LIST

10 Lens-diaphragm systems
11 Electromagnetic beam
12 3D modulator
13 Detection system
14 Point of origin of an electromagnetic beam in the 3D modulator
15 Modulation filter
16 Second lens-diaphragm system
17 Imaging detection system
18 Filter element or image element
19 Detector element
20 Primal image of a detector element
21 Edge element
23 Deflection element
24 Undeflected electromagnetic beams
25 Undeflected electromagnetic beams
26 Deflected electromagnetic beams
27 Deflected electromagnetic beams
28 Airy disk diameter
29 Distance between 3d modulator and detection system
30 Object
32 Azimuth angle
33 Polar angle
34 3D volume holographical diffraction grating

We claim:

1. A method for accurately determining spatial and/or time intervals in a focused image or focused sequence of images of a lens-diaphragm system and/or of spatial and/or time-related object-parameters and/or spectral and/or position frequency-specific object-parameters comprising method steps as follows:

(a) focusing incident electromagnetic beams through the lens-diaphragm system;

(b) modulating in a position-specific manner a direction of propagation and/or intensity and/or wavelength and/or polarization and/or time modulation-frequency of electromagnetic beams using a 3D modulator behind the lens-diaphragm system in or near a focal plane of the lens-diaphragm system;

(c) detecting modulated electromagnetic beams by a detection system located behind the 3D modulator;

(d) calculating spatial and/or time intervals of the electromagnetic beams in the 3D modulator by determining modulation and/or computation of spatial and/or time and/or spectral and/or position frequency-specific object-parameters.

2. Method as claimed in claim 1 further comprising method steps as follows:

(b-1) position-specific modulation of the electromagnetic beams using the 3D modulator with at least one modulation filter in the focal plane of the lens-diaphragm system, said 3D modulator modulating an incident electromagnetic beam by position-specific filter elements indexed by i, the filter elements being selected to be modulating or non-modulating in a comparatively high alternating manner regarding solvability of systems of equations to implement step (d);

(c-1) focusing within the detection system by a second lens-diaphragm system;

(c-2) measuring the modulated electromagnetic beams in the focal plane of the detection system using an imaging detector array of detector elements indexed by j, the filter elements indexed with i from an associated index population $I_j$ being projected into said focal plane;

(d-1) calculation of an accurate position of a parameter-determined intensity distribution in a beam path directly in front of the 3D modulator in a primal image of a jth detector element from measurement in the jth detector element with calculation being carried out in such a manner that due to modulation measurements a number of measurements exceeds a number of parameters to be determined and a system of equations as independent as possible is obtained.

3. Method as claimed in either of claim 1 or 2 further comprising:

(d-1-1) implementing calculation for an edge element parameterized by slope m and y-axis intersect b in an x-y plane of the 3D modulator according to y=mx+b.

4. Method as claimed in claim 2 wherein the jth detector element is used together with adjacent detector elements.

5. Method as claimed in claim 1 wherein the modulating of step (b) includes use of filter elements.

6. Method as claimed in claim 1 further comprising method steps as follows:

(b-1) position-specific modulation using a modulator which is a device for position-specific deflection with deflection elements and capable of modulating intensity, wavelength, polarization and modulation frequency of electromagnetic beams in or near the focal plane of the lens-diaphragm system;

(d-1) calculating a point-of-origin of an electromagnetic beam under consideration in the 3D modulator by signals detected by detector elements and ensuing spatial and/or time intervals in focused image sequences of the lens-diaphragm system and/or spatial and/or time-related object-parameters.

7. Method as claimed in claim 1 further comprising method steps as follows:

(b-1) position-specific modulation of the electromagnetic beams by means of the 3D modulator in a form of a curved diffraction grating in or near the focal plane of the lens-diaphragm system with diffracted beams being oriented according to the reflection at sloping lattice planes of the curved 3D diffraction grating and/or being intensity-modulated corresponding to conditions of grating aperture and/or polarized in relation to anisotropies of the diffraction grating and/or time-modulated in relation to any imparted time oscillation, position-specific curvature of the diffraction grating alternating often enough with respect to the position-specific modulation concerning solvability of systems of equations to carry out step (d);

(d-1) calculating a point-of-origin of an electromagnetic beam being considered in the 3D modulator using signals detected by detector elements and ensuing spatial and/or time intervals in focused image sequences of the lens-diaphragm system and/or spatial and/or time-related object-parameters.

8. Method as claimed in claim 1 further comprising method steps as follows:

(c') distinguishing between the electromagnetic beams incident on a detector element that are from a 0th order of diffraction and the electromagnetic beams from a higher order of diffraction by specific wavelengths of diffracted electromagnetic beams as given by the Bragg condition and/or by directionally-specific detector elements;

(d') calculating a point-of-origin of an electromagnetic beam being considered in the 3D modulator using signals detected by detector elements and ensuring spatial and/or time spacings in focused image sequences of the lens-diaphragm system and/or spatial and/or time-related object-parameters.

9. Method as claimed in claim 1 further comprising method steps as follows:

(c") using a time-related highpass filter for signals detected by a detector element, transmitted frequencies being adaptively adjusted in such a manner that substantially increased lateral speed of higher orders of diffraction arising in image sequences is detected and thereby distinction of the electromagnetic beams incident on a detector element between electromagnetic beams which are of a 0th order of diffraction and electromagnetic beams which arise from a higher order of diffraction;

(d") calculating a point-of-origin of an electromagnetic beam being considered in the 3D modulator by a signal detected by the detector elements and the ensuing spatial and/or time spacings in focused image sequences of the lens-diaphragm system and/or spatial and/or time-related object-parameters.

10. Method as claimed in claim 1 further comprising:

(b-1) position-specific modulation of the electromagnetic beams using the 3D modulator in a form of an uncurved 3D diffraction grating in or near the focal plane of the lens-diaphragm system, diffracted beams being oriented in relation to reflection at neighboring lattice planes of uncurved 3D diffraction grating and/or corresponding to grating aperture conditions modulated in intensity and/or corresponding to the Bragg condition modulated in wavelengths and/or corresponding to anisotropies of diffraction grating polarized and/or corresponding to any imparted time oscillation being time-modulated, diffraction-grating properties regarding solvability of system of equations to implement step (d) being alternating;

(d-1) calculating a point-of-origin of an electromagnetic beam being considered in the 3D modulator using signals detected by detector elements and ensuing spatial and/or time spacings in focused time sequences of the lens-diaphragm system and/or spatial and/or time-related object-parameters.

11. Method as claimed in one of claims 7, 8, 9 or 10 wherein steps (c) and (d) are carried out in the Fraunhofer far-field.

12. Method as claimed in one of claims 7, 8, 9 or 10 wherein steps (c) and (d) are implemented in Talbot- or Fresnel-planes in the near field and other regions behind a 3D diffraction grating.

13. Method as claimed in claim 12 further comprising method steps as follows:

recording depth position of focus in the Talbot- and/or Fresnel planes with a depth-sensitive detector element;

calculating difference of two adjacent distances between objects.

14. Method as claimed in claim 1 further comprising method steps as follows:

(a'-1) initial specification of prominent 3D features or patterns in a form of image elements together with a position image element as source of a local coordinate system for each 3D pattern or for each 3D feature;

(a'-2) implementation of a learning phase wherein each 3D feature is moved into each 3D position and 3D orientation, or each 3D pattern is moved into each 3D position and 3D orientation;

thereupon detector element j is determined upon which the position image element is to be projected, thereafter an associated signal pattern is determined, inclusive signal patterns of modulations, of detector elements around a jth detector element, and thereafter assignment of the jth detector element together with signal patterns of surrounding detector elements to a 3D pattern or 3D feature, position of the position image element and orientation being stored into an associative neural network;

(a'-3) application of the learned and stored assignment to the measured jth detector element together with signal patterns of surrounding detector elements to 3D pattern or 3D feature, position of the position image element and orientation by means of an associative neural network.

15. Method as claimed in claim 14 wherein patterns are used in a form of image elements based on intensity patterns in the focal plane of the lens-diaphragm system and/or motion patterns and/or frequency patterns and/or color or wavelength patterns and/or polarization patterns and/or intensity maxima and/or 3D shapes.

16. Method as claimed in one of claims 14 or 15 wherein neural networks are used which learn by Hopfield rule or a Perceptron learning rule or a back-propagation learning rule and contain couplings between two neurons and/or couplings between three neurons and/or couplings between four neurons and/or couplings between a maximum number of neurons matched to a complexity of the signal patterns, and which for complex learning tasks contain a Perceptron learning algorithm together with couplings with a maximum number of neurons matched to a complexity of the signal patterns, thereby assuring a solution to a learning task corresponding to a convergent proof.

17. Method as claimed in one of claims 14 or 15 further comprising:

(a'-2-1) storage of an assignment by an electronic or optical memory.

18. Method as claimed in claim 1 further comprising implementing the calculating and/or neural networks in front of or behind the detector plane by a correlation-optical design.

19. Apparatus to implement the method as claimed in claim 1 wherein the lens-diaphragm system images a scene and the detection system is mounted behind the lens-diaphragm system, wherein the 3D modulator modulates in a position specific manner direction of propagation and/or intensity and/or wavelength and/or polarization and/or modulation frequency of the electromagnetic beams, said 3D modulator being located behind the lens-diaphragm system in or near the focal plane of said lens-diaphragm system, the detection system, which detects modulated electromagnetic beams, being mounted behind the 3D modulator.

20. Apparatus as claimed in claim 19 wherein the 3D modulator comprises a modulation filter in the focal plane of the lens-diaphragm system containing deflection elements in a form of specular elements.

21. Apparatus as claimed in claim 19 wherein the 3D modulator comprises a curved 3D diffraction grating converting incident electromagnetic beams into diffracted electromagnetic beams, the diffracted electromagnetic beams being oriented according to reflection at sloping lattice planes of the curved 3D diffraction grating and/or modulated in intensity according to grating-aperture conditions and/or modulated in wavelength according to Bragg condition and polarized according to anisotropies of the diffraction grating and/or time-modulated according to any imparted time oscillation.

22. Apparatus as claimed in claim 19 wherein the 3D modulator comprises an uncurved 3D diffraction grating, where diffracted beams are oriented according to reflection at sloping lattice planes and/or are intensity-modulated according to grating aperture conditions and/or are modulated in wavelength according to Bragg condition and/or are polarized according to anisotropies of diffraction grating and/or are time-modulated according to any imparted time-oscillation.

23. Apparatus as claimed in one of claims 21 or 22 wherein the 3D diffraction grating represents one of 231 possible periodic 3D crystal lattices.

24. Apparatus as claimed in one of claims 21 or 22 wherein the 3D diffraction grating is aperiodic.

25. Apparatus as claimed in one of claims 21 or 22 wherein the 3D diffraction grating comprises several layers of 2D gratings.

26. Apparatus as claimed in one of claims 21 or 22 wherein the 3D diffraction grating comprises acousto-optic cells.

27. Apparatus as claimed in one of claims 21 or 22 wherein the 3D diffraction grating includes Wigner crystals.

28. Apparatus as claimed in one of claims 21 or 22 wherein the 3D diffraction grating includes polymer lattices.

29. Apparatus as claimed in one of claims 21 or 22 wherein the 3D diffraction grating is made holographically.

30. Apparatus as claimed in one of claims 21 or 22 wherein the 3D diffraction grating is composed of biological structures and/or liquid crystals and/or ferroelectrics.

31. Apparatus as claimed in one of claims 21 or 22 wherein the 3D diffraction grating is tunable electro-optically and/or magneto-optically and/or mechanically.

32. Apparatus as claimed in claim 19 wherein the detection system is spectrally sensitive.

33. Apparatus as claimed in claim 19 wherein the detection system is directionally sensitive.

34. Apparatus as claimed in claim 19 wherein the detection system comprises as least one polarizing filter.

35. Apparatus as claimed in claim 21 wherein further gratings are mounted in an imaging optical beam path in addition to the 3D diffraction grating and alter degree of coherence and/or polarization state and/or phase.

36. Apparatus as claimed in claim 19 wherein the detection system comprises a CCD array and/or a CID array.

37. Apparatus as claimed in claim 19 wherein the detector elements comprise waveguides.

38. Apparatus as claimed in claim 19 wherein the lens-diaphragm system, the detection system and the 3D modulator are designed for electromagnetic waves outside visible light range.

39. Apparatus as claimed in claim 19 wherein a carrier frequency oscillation is introduced into the 3D modulator and/or the detection system.

40. Apparatus as claimed in claim 19 further comprising a neural network.

41. Apparatus as claimed in claim 19 further comprising a correlation optics unit in front of or behind the detector plane to carry out calculations.

42. Apparatus as claimed in claim 41 wherein the correlation optics unit comprises a 4f optics.

43. Apparatus as claimed in claim 19 wherein filter elements and/or deflection elements and/or grating elements are present in a relatively frequently alternating manner using a random number generator in the 3D modulator.

* * * * *